United States Patent [19]

Bryan et al.

[11] 4,331,984
[45] May 25, 1982

[54] METHOD AND APPARATUS FOR SYNCHRONIZING FACSIMILE TRANSMISSIONS

[75] Inventors: T. James Bryan, Altamonte Springs; Jack D. Burton, Orlando; F. Peter Tyrrell, Altamonte Springs, all of Fla.

[73] Assignee: Exxon Research & Engineering Co., Florham Park, N.J.

[21] Appl. No.: 120,341

[22] Filed: Feb. 11, 1980

[51] Int. Cl.³ .............................................. H04N 1/36
[52] U.S. Cl. .................................. 358/275; 358/267; 358/273
[58] Field of Search ................. 358/275, 267, 273, 264

[56] References Cited

U.S. PATENT DOCUMENTS

| | | | |
|---|---|---|---|
| 3,582,550 | 6/1971 | Latanzi | 358/275 |
| 3,937,883 | 2/1976 | Tanimoto | 358/275 |
| 4,044,383 | 8/1977 | Vandling | 358/264 |
| 4,146,908 | 3/1979 | Vandling | 358/275 |

Primary Examiner—Howard Britton
Attorney, Agent, or Firm—Norman L. Norris; Dale Heist

[57] ABSTRACT

The scanning mechanism of facsimile transmitter and receiver units are synchronized by comparing the relative positions of each of the scanning mechanism at a particular time. A variation in the rate of the scanning motion for one of the scanning mechanisms is then initiated and this variation is continued until a predetermined time corresponding to a substantial degree of coincidence in the scanning position of each of the scanning mechanisms. The variation in the rate of the scanning motion is a substantially ramp-like function of time.

14 Claims, 7 Drawing Figures

METHOD AND APPARATUS FOR SYNCHRONIZING FACSIMILE TRANSMISSIONS

BACKGROUND OF THE INVENTION

This invention relates to facsimile transmitters and receivers of the type utilized to transmit and receive information-bearing signals representing the dark/light variations on a document located at the transmitter and converting the information-bearing signals to marks or images on a copy medium located at the receiver so as to form a copy which is a reasonable facsimile of the original document.

Such facsimile transmitters and receivers include scanning mechanisms which permit the document at the transmitter to be scanned for dark/light variations and a copy medium at the receiver to be scanned while reproducing the dark/light variations at the transmitter. In order to have a faithful facsimile, it is necessary to achieve a certain degree of synchronization between the transmitter and the receiver. In general, this requires that the rate of scanning motion at the transmitter scanning means equal the rate of scanning motion at the receiver scanning means. In addition, it requires that the position of the transmitter's scanning mechanism corresponds substantially to the position of the receiver scanning mechanism.

In order to achieve this type of synchronism, the scanning mechanism at the transmitter unit is, for a period of time, run at a different scanning rate than the scanning mechanism at the receiver. Typically, it is the receiver's scanning rate which is altered by first running the receiver's scanning mechanism at a rate at which differs substantially from the normal scanning rate which the transmitter is running. After a certain degree of synchronism is achieved, the scanning rate at the receiver is changed to substantially correspond with the scanning rate of the transmitter. In some instances, the change of the scanning rate at the receiver still differs slightly from the scanning rate at the transmitter so as to permit a still finer adjustment in synchronism. When a more substantial degree of synchronism is achieved, the scanning rate at the receiver is changed so as to exactly equal the scanning rate at the transmitter.

The above-described method of synchronism is disclosed in U.S. Pat. No. 4,044,383—Vandling assigned to the assignee of this invention. It is also disclosed in U.S. Pat. No. 3,582,550—Latanzi et al. In both of these patents, the scanning rate at the receiver assumes constant levels which are maintained until such time as the desired degree of synchronization is achieved.

Although the above-described synchronization technique is effective, the technique is time consuming. Generally speaking, there are certain time limitations imposed on achieving synchronization between a transmitter and a receiver. In particular, the CCITT Standards permit approximately six seconds for phasing or achieving synchronization in an AM mode and approximately fifteen seconds for achieving phasing or synchronization in an FM mode. While phasing using the above-described technique can be achieved within this time limitation imposed by the CCITT Standards under the proper circumstances, automatic paper or sheet handling substantially reduces the amount of time available for phasing or synchronizing since paper for sheet handling to the scanning mechanism may, at least in some instances, occur during the phasing or synchronizing period. As a practical matter, even assuming rapid sheet feeding such as that disclosed in copending application Ser. No. 120,461 filed Feb. 11, 1980, this may reduce the amount of time available for paper feeding to less than three seconds in the AM mode and less than seven seconds in the FM mode.

SUMMARY OF THE INVENTION

It is an object of this invention to provide a method and apparatus for rapid synchronization of transmitting and receiving facsimile apparatus.

In accordance with this and other objects, a facsimile system comprising a transmitter including document scanning means and a receiver including copy medium scanning means. Scanning motion is initiated for at least one of the scanning means. The relative scanning positions of each of the scanning means are then compared. A variation in the rate of scanning motion for the scanning means is initiated at a particular time and the variation is continued until a predetermined time corresponding to a substantial degree of coincidence in the scanning position of both the scanning means.

In the preferred embodiment of the invention, sync pulses are generated representing the scanning position of each of the scanning means and the relative positions of the sync pulses are compared to determine the relative scanning positions. The time lapsed between the sync pulse for one of the scanning means and the particular time of initiation of the variation plus the duration of the continuing variation up to the predetermined time is substantially equal to the period of synchronizing pulses after synchronization times an integral number.

In accordance with an important aspect of the invention, the variation in the rate of scanning motion is a ramp-like function where the rate increases with time.

In accordance with another important aspect of the invention, a predetermined relationship is sensed at the particular time as a result of the comparing.

In the preferred embodiment of the invention, different rates of scanning motion are maintained after the predetermined time to obtain a more substantial degree of coincidence in the scanning positions and the scanning rates are substantially equalized after the occurrence of a more substantial degree of coincidence in scanning positions.

DETAILED DESCRIPTION OF PREFERRED EMBODIMENTS

Figure 1:
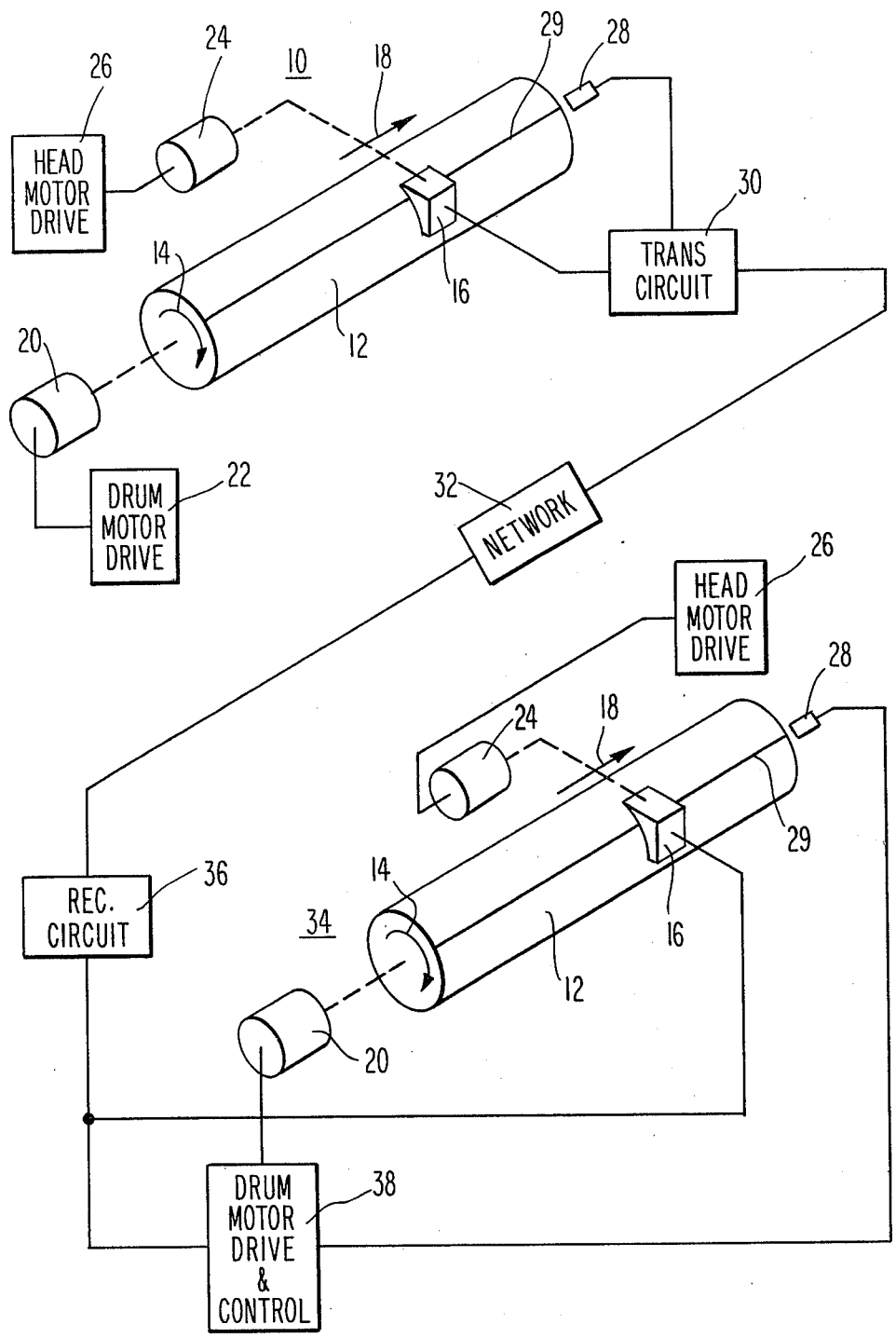
FIG. 1 is a partially schematic block diagram illustrating the environment of the invention.

A facsimile system representing the environment of this invention will now be described with reference to FIG. 1. As shown therein, the facsimile transmitter 10 comprises a scanning means in the form of a drum 12 which rotates as indicated by an arrow 14 and a head 16 which is capable of linear motion as indicated by an arrow 18 to achieve everchanging scanning positions as a document carried by the drum 12 is scanned by a line-by-line basis. The drum 12 is driven by a motor 20 which is supplied by a drum motor drive 22 which determines the rate of scanning motion for the drum 12. The head 16 is driven by a motor 24 which is supplied by a head motor drive 26 which determines the rate of scanning motion for the head 16.

In order to generate a signal representing the position of the drum 12 relative to the head 16, a position detector 28 is provided. The detector 28 senses, for example, a clamp 29 on the drum 12 which holds a document in place as suitable optical means carried by the head 16 detect dark/light variations in the document as the drum 12 rotates. The output from the detector 28 is applied to a transmission circuit 30 including suitable modulating means for generating the transmission signal representing the position of the drum 12. This signal shall hereafter be described as a synchronizing pulse which represents the position of the scanning means at the transmitter 10. The transmitter circuit 30 also modulates the dark/light variation signals detected by the head 16. The dark/light transmission signals as well as the synchronizing pulses are transmitted to a receiver over a suitable network 32 which may, for example, be a telephone network.

A receiver 34 includes many of the same components as the transmitter 10 to the extent that these components are essentially identical in function, the same reference characters have been applied and these components will not be further described.

The receiver 34 differs from the transmitter 10 since it necessarily comprises a receiver circuit 36 and, in accordance with this invention, comprises a novel drum motor drive and control circuit 38 which is coupled to the receiver motor 20 as well as the drum position detector 28 so as to receive and operate on synchronizing pulses for the receiver drum 12. The drum motor drive and control 38 is also coupled to the receiver circuit 36 so as to receive and operate on synchronizing pulses from the transmitter drum 12.

Figure 2:
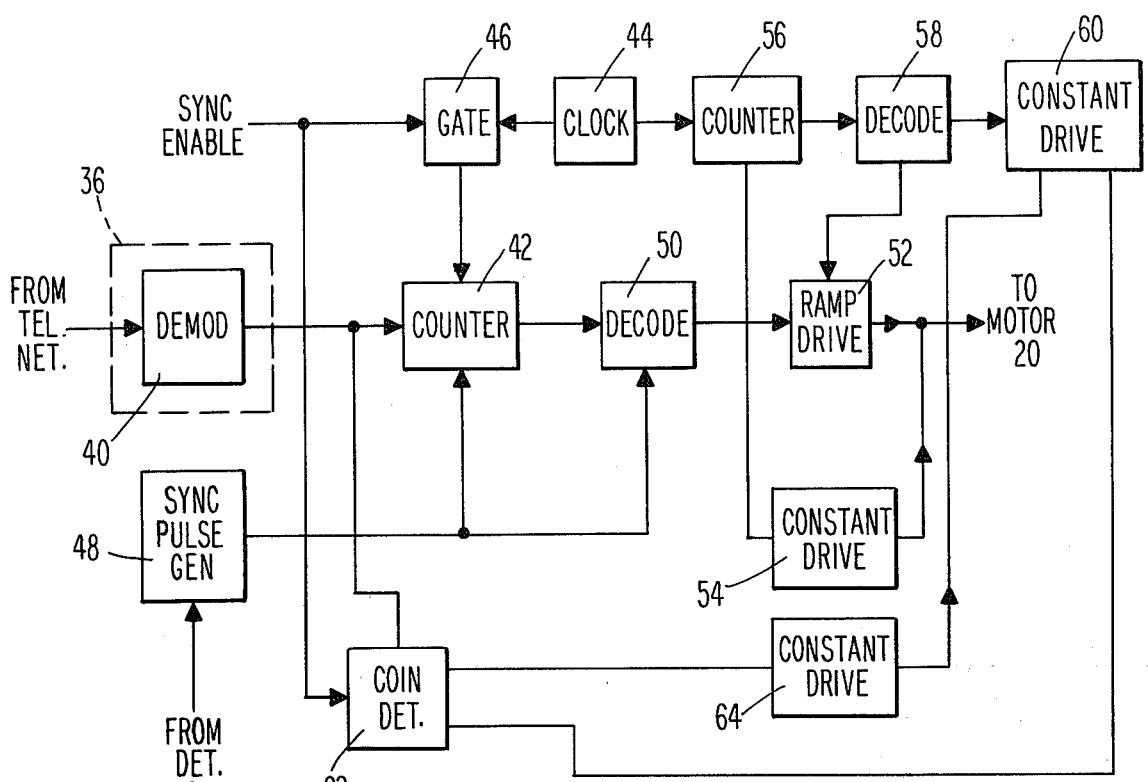
FIG. 2 is a block diagram depicting one embodiment of the invention.

Reference will now be made to FIG. 2 for a discussion of the preferred embodiment of the drum motor drive and control 38 and associated circuitry. As shown in FIG. 2, the demodulator 40 which forms part of the receiver circuit 36 is coupled to the circuitry of the drum motor drive and control 38. The output from the demodulator 40 is a series synchronizing pulses representing the position of the transmitter drum 12. The synchronizing pulses are applied to a counter 42 so as to reset the counter 42. The counter 42 receives a series of clock pulses from a clock pulse source 44 which are applied to counter 42 through a gate 46 enabled only during the sync period in response to a sync enable signal. When the count accumulated in the counter 42 reaches a predetermined number at the time of a sync pulse from the receiver sync pulse generator 48 supplied to and sets the count in the counter 42, a decoder 50 which is enabled by the sync pulse generator 48 will produce an output to initiate a ramp-like drive function which is applied to the receiver drum motor 20. Prior to this time at which the ramp drive function is initiated, which time represents a predetermined phase relationship between the synchronizing pulses of the transmitter and receiver, a constant drive function is applied to the motor 20 from the constant drive circuit 54. This constant drive circuit 54 is inhibited at this particular time of application of the ramp drive by the decoder 50.

The ramp drive 52 continues for a predetermined length of time which corresponds to the accumulation of a predetermined count in a counter 56 which is reset by the output of the decoder 50 coupled to the source of clock pulses 44. A decoder 58 coupled to the counter 56 inhibits the ramp drive 52 when a predetermined count corresponding to a predetermined time is accumulated. Simultaneously, a constant drive circuit 60 is enabled by the decoder 58 so as to apply a constant drive function to the motor 20. Preferably, the constant drive function applied to the motor 20 at this predetermined time produces a rate of scanning motion or a velocity of the receiver drum 12 which differs slightly from the rate of motion or velocity of the transmitter drum 12. As a consequence, the synchronizing process continues until precise synchronization between the transmitter drum 12 and the receiver drum 12 is accomplished as determined by a coincidence detector 62 which enables a constant drive circuit 64 which produces a receiver drum velocity substantially equal to or identical with the transmitter drum velocity. The coincidence detector 62 also inhibits the constant drive 60.

Figure 4:
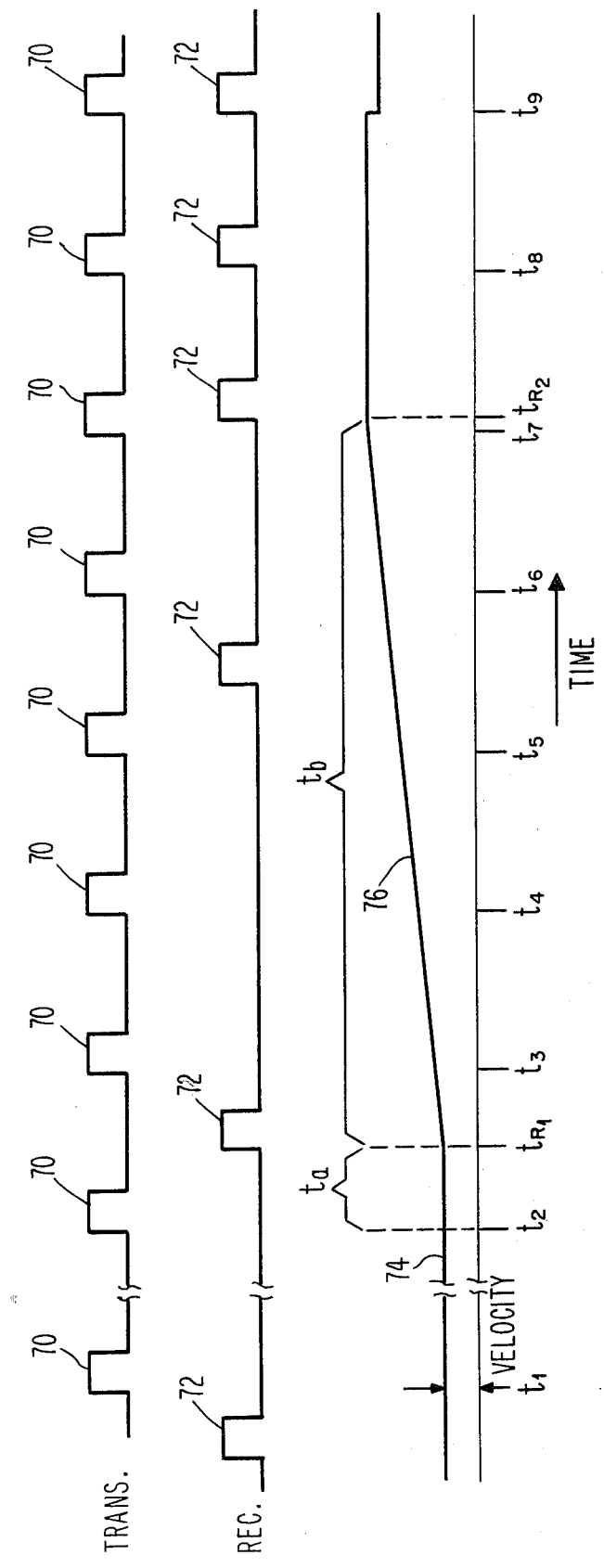
FIG. 4 is a waveform diagram utilized in explaining the operation of the embodiments of FIGS. 2 and 3.

Reference will now be made to FIG. 4 for a description of the relationship between the synchronizing pulses of the transmitter and receiver and the various drive functions applied to the drum motor 20 of the receiver 34. As shown in FIG. 4, a series of transmitter synchronizing pulses 70 have a constant frequency and are substantially equally spaced in time. In contrast, receiver synchronizing pulses 72 have a variable frequency and are variably spaced in time. From time $t_1$ through $t_R$, the velocity of the receiver drum 12 is maintained substantially constant and at a relatively low level 24. This velocity of the receiver drum 12 permits a phase relationship of the transmitter synchronizing pulses 70 and the receiver synchronizing pulses 72 to very dramatically and in a relatively short period of time.

As shown in FIG. 4, the predetermined relationship between the transmitter synchronizing pulse 70 and the receiver synchronizing pulse 72 is detected between times $t_2$ and $t_3$. This predetermined relationship is established by the counter 42 in conjunction with the decoder 50 so as to enable the ramp drive 52 to produce a ramp-like drive function 76 over time $t_b$ which begins at time $t_{R1}$ shortly before $t_3$. It will be noted that the time $t_a$ from time $t_2$ which corresponds to the onset of the transmission pulse 70 to time $t_{R1}$ plus $t_b$ from time $t_{R1}$ to time $t_{R2}$ is equal to an integral number of transmission drum revolutions as represented by each of the pulses 70.

After time $t_{R2}$, a constant velocity is maintained until time $t_9$. During this period, the velocity for the scanning rate of the receiver drum 12 is in excess of the velocity of the transmitter drum 12. Accordingly, the receiver pulses 72 which lead the transmitter pulses 70 creep from relative positions of substantial coincidence or synchronization to relative positions of substantially complete or virtual coincidence or synchronization at time $t_9$. At time $t_9$, the velocity of the receiver drum is substantially reduced so as to equalize the velocity of the transmitter drum.

Referring now to FIG. 2, the time $t_a$ is determined by the counter 42 in combination with the decoder 50. The time $t_b$ is determined by the counter 56 in combination with the decoder 58. The time between $t_{R2}$ and $t_9$ is determined by the coincidence detector 62.

Again referring to FIG. 2 in view of FIG. 4, the velocity from time $t_1$ to $t_{R1}$ which is substantially constant is determined by the drive 54. The velocity during $t_b$ from $t_{R2}$ to time $t_{R2}$ is determined by the ramp drive 52. The velocity from time $t_{R2}$ to time $t_9$ is determined by the constant drive 60 and the constant velocity after time $t_9$ is determined by the constant drive 64.

Although the specifics of the drives 52, 54, 60 and 62 have not been described, it will be appreciated that various drives may be employed depending upon the particular motor chosen. For example, the use of a DC drum motor 20 would dictate the use of a variable voltage drive in the case of the ramp drive 52 and constant voltage drives in the case of drives 54, 60 and 64. On the other hand, the use of an AC synchronous motor for the drum motor 20 would dictate the use of a variable frequency drive for the ramp drive 52 and a constant frequency drive for the drives 54, 60 and 62.

Figure 5:
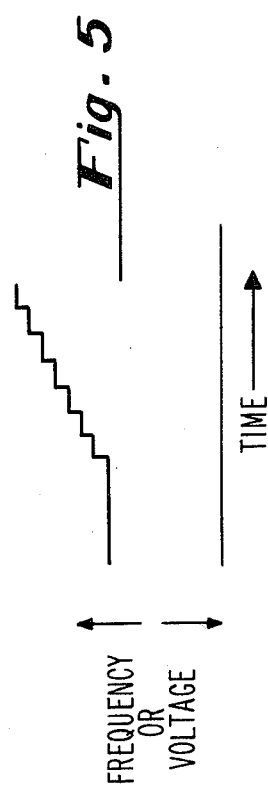
FIG. 5 is a waveform diagram representing a portion of a waveform in FIG. 4 in more detail.

In the case of the ramp drive 52, it will be appreciated that the ramp may be step-like as shown in FIG. 5 for both a variable frequency as well as a variable voltage drive.

Figure 3:
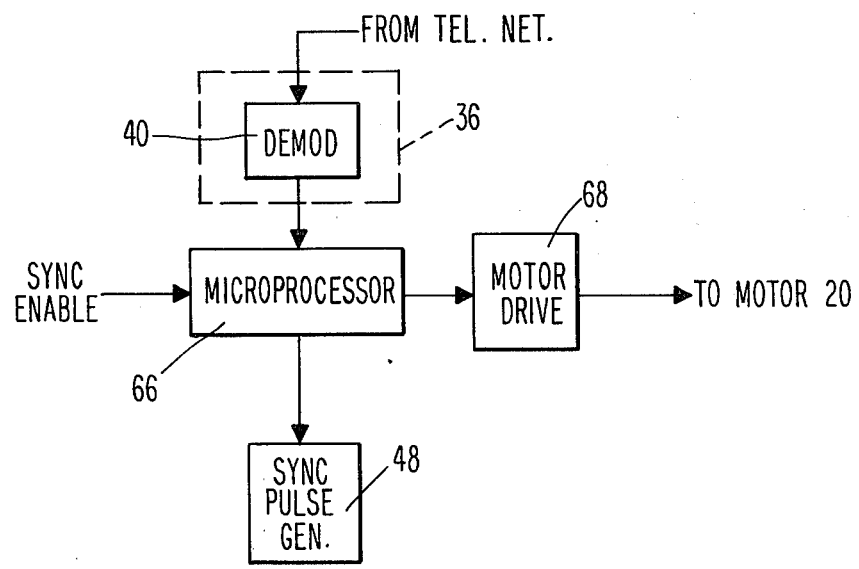
FIG. 3 is a block diagram depicting another embodiment of the invention.

In the embodiment of FIG. 2, a single transmitter scanning rate or velocity is assumed and a corresponding single frequency for the transmitted sync pulse 70. In fact, the transmitter 10 may be capable of a variety of transmission modes with corresponding variations in the drum velocity and the frequency of the transmitter synchronizing pulses 70. For the systems with such a capability, it may be desirable to utilize a microprocessor control circuit as shown in FIG. 3 rather than the discrete logic circuitry shown in FIG. 2. As shown in FIG. 3, a microprocessor 66 is coupled to the output of the demodulator 40 and the output of the sync pulse generator 48. In addition, a sync enable signal is supplied to the microprocessor 66. The output of the microprocessor 66 is supplied to motor drive circuitry 68 capable of supplying motor 20.

Figure 6:
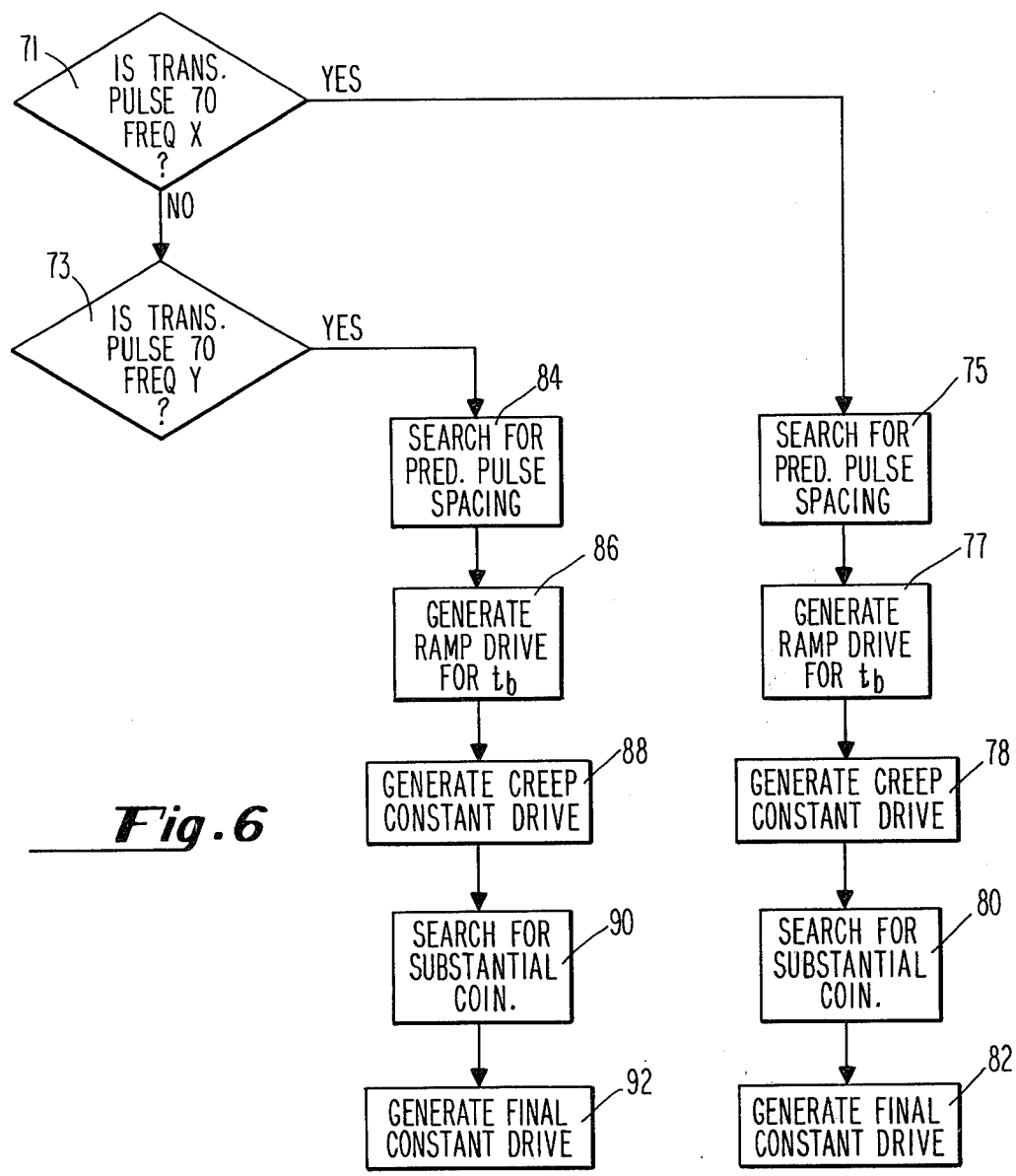
FIG. 6 is a flowchart utilized to describe the operation of the embodiment of FIG. 3.

The microprocessor controlled motor drive of FIG. 3 will now be described as reference to the block diagram shown in FIG. 6. On the outset, it will be appreciated that two possible transmitter drum velocities have been assumed generating transmission synchronizing pulse frequencies of X and Y. The determination as to which synchronizing pulse frequency is present is made at blocks 71 and 73. If the transmitter synchronizing pulses 70 are of of a frequency X, the microprocessor begins to search for a predetermined relationship between the receiver synchronizing pulses and the transmitter synchronizing pulses as depicted by block 75. Once the predetermined relationship between the transfer synchronizing pulses and the receiver synchronizing pulses is detected, a predetermined drive ramp function is supplied for a time $t_{b1}$ as shown in block 77. At the end of the time period $t_{b1}$, the synchronizing pulses 70 and 72 are in substantial coincidence as depicted by the condition at time $t_{R2}$ in FIG. 4. Thereafter, a constant drive function is applied to the motor drive circuit 68 during which the receiver pulses 72 creep into more substantial synchronization with the transmitter pulses 70 as depicted by block 78. As this creeping occurs, a search is made for a more substantial degree of coincidences as indicated at time $t_9$ and depicted by block 80. Finally, after time $t_9$, a constant drive is applied so as to maintain substantially equal drum velocities at the transmitter and receiver as depicted at block 82.

In the event that the frequency of the transmitted synchronizing pulses is Y and not X, the same series of steps is repeated except different drive functions are generated so as to accomodate the different frequency as depicted by blocks 84, 86, 88, 90 and 92. It will be noted that the time during which the ramp drive is applied is $t_{b2}$ rather than $t_{b1}$. This difference in time is required by the different spacing between the transmitted synchronizing pulses 70 for a frequency of X as compared with the frequency of Y. However, in both instances, the duration of the ramp function is predetermined, i.e., the time $t_{b1}$ or the time $t_{b2}$ is fixed prior to applying the ramp function.

Figure 7:
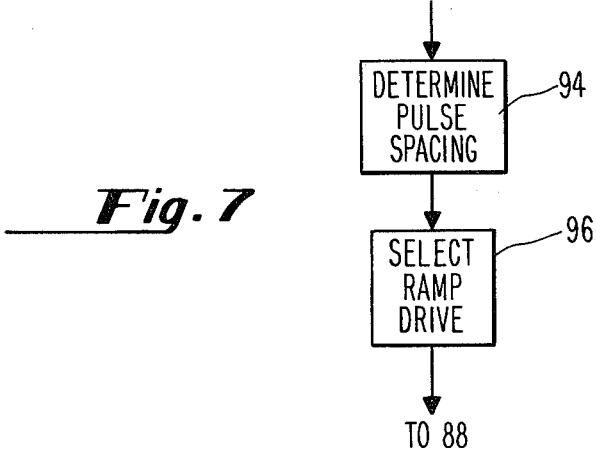
FIG. 7 is a partial flowchart utilized in explaining an alternative embodiment of the invention.

The microprocessor depicted in FIG. 3 permits further sophistication as will now be described with reference to FIGS. 4 and 7. In FIG. 4, it has been assumed that the time $t_a$ is fixed for the particular frequency of the transmitted synchronizing pulse 70. However, the microprocessor 66 does not necessarily require that this time be fixed or that the relationship between the transmitted synchronizing pulses 70 and the receiver synchronizing pulses 72 is predetermined. Rather, it is possible for the microprocessor to determine any spacing between the pulses 70 and 72 as depicted by block 94 of FIG. 7 and then select a ramp function as depicted by block 96 which will assure the proper positioning of the receiver transmitting pulse 72 with respect to the transmitter receiving pulse 70 to achieve a desired degree of coincidence. In the embodiment of FIG. 7, the steps represented by the blocks 94 and 96 would be substituted for the steps represented by the blocks 84 and 86 in FIG. 6 as depicted by arrows 98 and 100.

Generation of the various ramp function are, of course, easily accomplished with the microprocessor by utilizing various various look-up tables to generate the desired signals. For example, a look-up table may be utilized to generate a variety of signals of ever-increasing frequency in a step-like fashion is depicted in FIG. 5. Similarly, a variety of signals may be generated having ever increasing voltages as also depicted in FIG. 5.

In the foregoing, the drive function has been described as ramp-like. It is not, of course, necessary that the function be ramp-like, i.e., of substantially constant slope. As noted with reference to FIG. 5, the function may be step-like in fashion. Moreover, the overall slope may be substantially nonlinear.

Although the scanning means shown in the subject application includes rotatable drums at both the transmitter and receiver, it will also be appreciated that other scanning means may be utilized. For example, flat bed scanners may utilized.

Although particular embodiments of the invention have been shown and described and various alternatives and modifications suggested, it will be appreciated that other embodiments, modifications and alternatives will occur to those of ordinary skill in the art without departing from the true spirit and scope of the invention as set forth in the appended claims.

What is claimed is:

1. A method of operating a facsimile system comprising a transmitter including document scanning means and a receiver including copy medium scanning means, the method comprising the following steps:
   initiating scanning motion for at least one of said scanning means;
   initiating a variation in the rate of the scanning motion for one of said scanning means at a particular time; and continuing the variation of said rate until a predetermined time corresponding to a substantial degree of coincidence in the scanning position of both said scanning means.

2. The method of claim 1 wherein scanning motion at both of said scanning means is initiated prior to said comparing.

3. The method of claim 1 including the step of generating sync pulses representing the scanning position of each of said scanning means, the relative positions of said pulses being compared to determine the relative scanning positions.

4. The method of claim 3 wherein the time lapse between the sync pulse for one of said scanning means and said particular time at said initiation of the variation plus duration of the continuing variation up to said predetermined time is substantially equal to the period of the sync pulses after synchronization times an integral number.

5. The method of claim 1 wherein the variation in the rate of the scanning motion is a ramp-like function wherein the rate increases with time.

6. The method of claim 1 including the step of sensing the predetermined relationship at said particular time.

7. The method of claim 1 including the step of maintaining different rates of scanning motion at said scanning means after said predetermined time to obtain a more substantial degree of coincidence in scanning position, and maintaining substantially equal rates of scanning after the occurrence of said more substantial degree of coincidence.

8. Facsimile apparatus comprising scanning means, means for receiving remote scanning position signals from a remote facsimile apparatus, means for generating local scanning position signals and improved drive control means comprising:
  comparator means for comparing the phase of said remote scanning position signals and said local scanning position signals;
  function generating means coupled to said comparator means for generating a function varying with time to drive to the scanning means when a particular phase relationship is detected by said comparator means; and
  means for interrupting the application of said function to said scanning means after a predetermined time corresponding to substantial coincidence between said scanning position signals.

9. The facsimile apparatus of claim 8 wherein said function is substantially ramp-like.

10. The facsimile apparatus of claim 8 further comprising means for applying a substantially constant drive to said scanning means after said predetermined time and until a more substantial degree of coincidences is detected by said comparator means.

11. A method of operating a facsimile apparatus comprising scanning means, means for receiving remote scanning position signals from a remote facsimile apparatus, means for generating local scanning position signals, and an improved drive control means comprising:
  comparing the phase of said remote scanning position signals and said local scanning position signals;
  generating a drive function varying with time;
  applying said drive function to said scanning means at a particular time representing a particular phase relationship detected by comparing; and
  interrupting the application of said drive function to said scanning means after a predetermined time corresponding to substantial coincidence between said position signals.

12. The method of claim 11 wherein the drive function generated comprises a ramp-like function.

13. The method of claim 12 further comprising the step of applying a substantially constant drive function to the scanning means after said predetermined time and until a more substantial degree of coincidences detected and thereafter applying a different substantially constant drive function maintaining substantial synchronism.

14. The method of claim 1 including the step of comparing the relative scanning positions of each of said scanning means prior to initiating a variation in the rate of the scanning motion of one of said scanning means at a particular time.

* * * * *

UNITED STATES PATENT AND TRADEMARK OFFICE
CERTIFICATE OF CORRECTION

PATENT NO. : 4,331,984
DATED : May 25, 1982
INVENTOR(S) : T. James Bryan, et al

It is certified that error appears in the above-identified patent and that said Letters Patent are hereby corrected as shown below:

At column 7, line 5, delete "claim 1" and substitute -- claim 14 -- therefor;

At column 7, line 8, delete "claim 1" and substitute -- claim 14 -- therefor.

Signed and Sealed this

*Fourteenth* Day of *September 1982*

[SEAL]

*Attest:*

*Attesting Officer*

GERALD J. MOSSINGHOFF

*Commissioner of Patents and Trademarks*